United States Patent [19]

Patel

[11] 4,186,942
[45] Feb. 5, 1980

[54] PASSIVE SHOULDER BELT

[75] Inventor: Chimanbhai M. Patel, Troy, Mich.

[73] Assignee: General Motors Corporation, Detroit, Mich.

[21] Appl. No.: 944,258

[22] Filed: Sep. 21, 1978

[51] Int. Cl.² .............................................. B60R 21/10
[52] U.S. Cl. .................................... 280/804; 280/807; 297/475
[58] Field of Search ...................... 280/744, 745, 747; 297/384, 385, 387, 388, 389

[56] References Cited

U.S. PATENT DOCUMENTS

| | | | |
|---|---|---|---|
| 3,680,883 | 8/1972 | Keppel et al. | 280/745 |
| 3,770,078 | 11/1973 | Keppel et al. | 280/745 X |
| 3,770,294 | 11/1973 | Hammer | 280/745 |
| 3,881,745 | 5/1975 | Chavez, Jr. | 280/745 |
| 3,889,971 | 6/1975 | Kazaoka et al. | 280/745 |

Primary Examiner—Joseph F. Peters, Jr.
Assistant Examiner—Michael Mar
Attorney, Agent, or Firm—Charles E. Leahy

[57] ABSTRACT

According to the invention, a shoulder belt has its inboard end mounted on the vehicle body generally adjacent the hip of the occupant and an outboard end mounted on the roof rail by a shoulder belt retractor. A track extends longitudinally along the roof rail and movably mounts a carriage which slidably receives the shoulder belt intermediate the inboard and outboard ends thereof. A drive cable of fixed length has its rearward end attached to the upper rear corner of the door and a forward end attached to the roof rail adjacent the forward end of the track so that the drive cable assumes a position generally coincident with the track when the door is closed and assumes a position angularly divergent from the track when the door is opened. The drive cable extends slidably through the guide loop to permit rearward retraction of the carriage by the belt retractor as the drive cable converges with the track during door closing movement to establish the belt in the restraining position. During opening movement of the door, the diverging drive cable slides through the carriage to induce forward movement of the carriage and unwind the belt from the retractor to move the shoulder belt to a forward stowed position facilitating occupant ingress and egress.

1 Claim, 5 Drawing Figures

PASSIVE SHOULDER BELT

The invention relates to a passive occupant restraint system and more particularly to a passive shoulder belt having an upper end movable along the roof rail between a rearward occupant restraining position and a forward occupant access position.

BACKGROUND OF THE INVENTION

It is well known to restrain an occupant in a seat by a shoulder belt extending diagonally across the upper torso between an inboard anchorage generally adjacent the hip of the occupant and an outboard anchorage on the roof rail or pillar of the vehicle body generally adjacent and behind the shoulder of the seat occupant. U.S. Pat. No. 3,680,883, issued to Keppel et al on Aug. 1, 1972 provides a track extending longitudinally along the roof rail and mounting a belt carriage which slidably receives the belt. The belt carriage is movable forwardly along the track to stow the diagonal shoulder belt forwardly of the occupant seat to facilitate occupant ingress and egress and rearwardly along the track to establish the shoulder belt in its normal occupant restraining position. The carriage of Keppel is conventionally moved between the forward and rearward positions by an electric motor driven pulley or worm gear arrangement of by a mechanical drive pulley arrangement such as shown in U.S. Pat. No. 3,770,078, issued to Keppel et al on Nov. 6, 1973. Another means of moving a carriage fore and aft along the roof rail is disclosed in U.S. Pat. No. 3,770,294, issued to Hammer on Nov. 6, 1973 where a cable extends between the carriage and the door to pull the carriage forwardly as the door is opened.

SUMMARY OF THE INVENTION

The present invention provides a new and improved arrangement for driving a roof rail mounted shoulder belt carriage forwardly in response to door opening movement.

According to the invention, a shoulder belt has its inboard end mounted on the vehicle body generally adjacent the hip of the occupant and an outboard end mounted on the roof rail by a shoulder belt retractor. A track extends longitudinally along the roof rail and movably mounts a carriage which slidably receives the shoulder belt intermediate the inboard and outboard ends thereof. A drive cable of fixed length has its rearward end attached to the upper rear corner of the door and a forward end attached to the roof rail adjacent the forward end of the track so that the drive cable assumes a position generally coincident with the track when the door is closed and assumes a position angularly divergent from the track when the door is opened. The drive cable extends slidably through the guide loop to permit rearward retraction of the carriage by the belt retractor as the drive cable converges with the track during door closing movement to establish the belt in the restraining position. During opening movement of the door, the diverging drive cable slides through the carriage to induce forward movement of the carriage and unwind the belt from the retractor to move the shoulder belt to a forward stowed position facilitating occupant ingress and egress.

Accordingly, the object, feature and advantage of the invention resides in the provision of a fixed length drive cable extending between the rear corner of the door and the forward end of the roof rail and extending slidably through a roof mounted shoulder belt carriage to induce forward movement of the carriage during divergence of the cable from the path of the track upon door opening movement.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
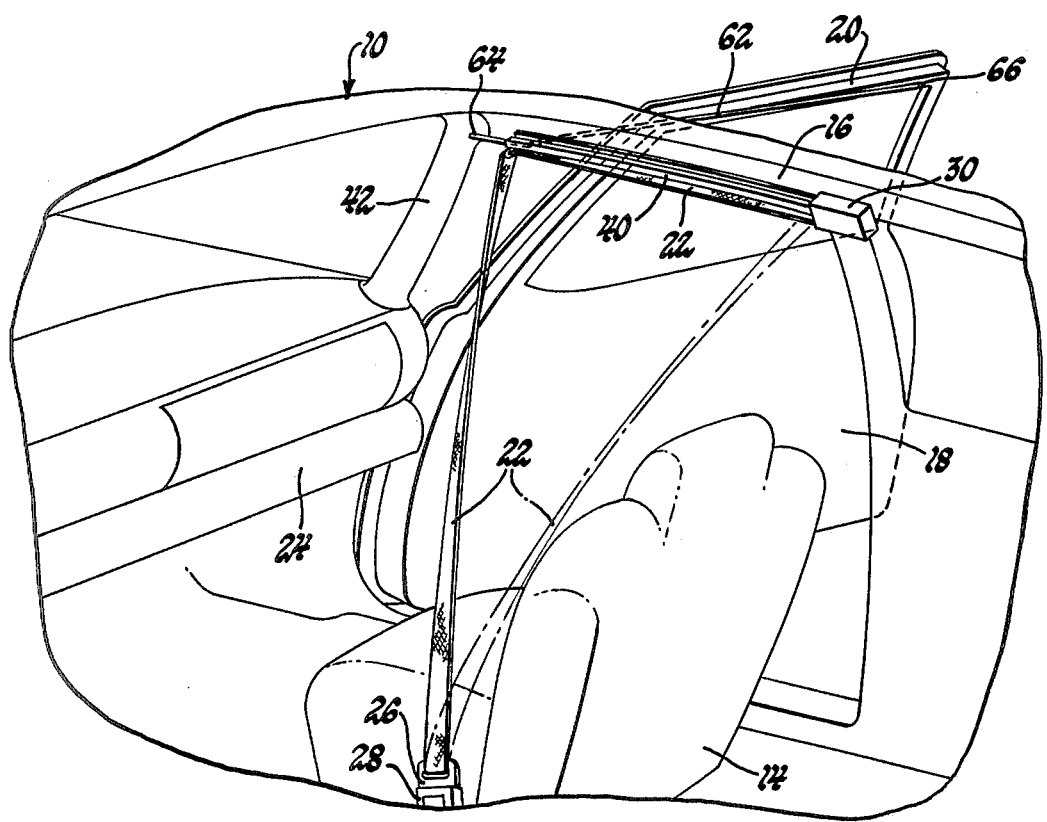
FIG. 1 is a perspective view of the vehicle body having a shoulder belt moved forwardly to an occupant access position when the vehicle door is in the full open position.
Figure 3:
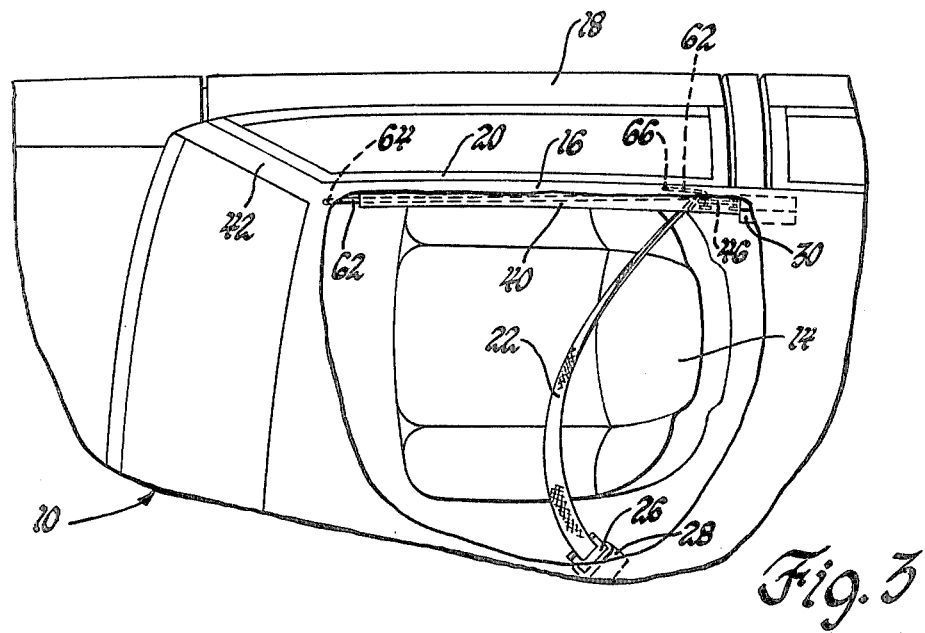
FIG. 3 is a view similar to FIG. 2 but showing the door in a closed position.

Referring to FIG. 1, there is shown a vehicle body 10 having a seat 14 adjacent a hingedly mounted door 18 movable between an open position shown in FIG. 1 and a closed position shown in FIG. 3. The door 18 has a window frame 20.

A passive occupant restraining system for restraining an occupant in the seat 14 includes a shoulder belt 22 for restraint of the upper torso and a knee pad 24 for restraint of the lower torso. The inboard end of the shoulder belt 22 is mounted on the vehicle body inboard the seat and generally adjacent the hip of the occupant by a latch plate 26 which is received in an emergency release buckle 28 suitably attached to the vehicle body. The outboard end of the shoulder belt 22 is mounted on the roof rail 16 of the vehicle body by a conventional vehicle sensitive inertia locking retractor 30 which winds the shoulder belt 22 to the occupant restraining position and permits extension of the shoulder belt 22 to the forwardly stowed occupant access position shown in the solid lines of FIG. 1.

Figure 4:
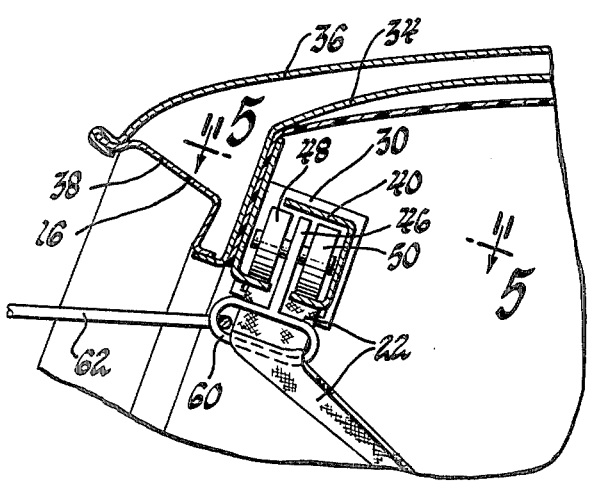
FIG. 4 is a sectional view taken in the direction of arrows 4—4 of FIG. 2.
Figure 5:
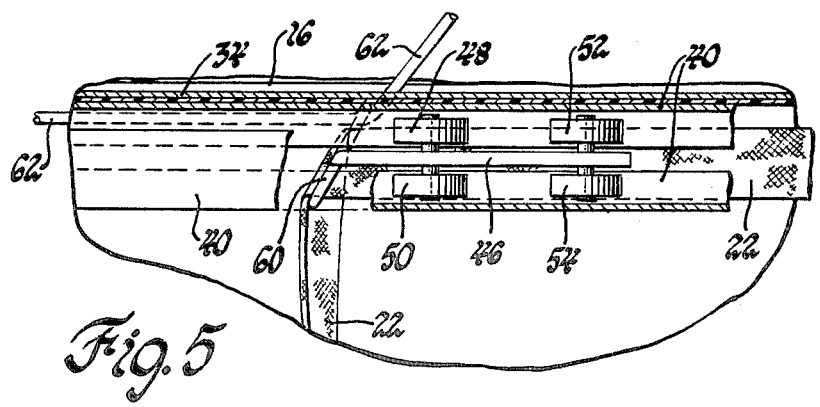
FIG. 5 is a sectional view taken in the direction of arrows 5—5 of FIG. 4.

Referring to FIGS. 4 and 5, it is seen that the roof rail 16 is formed in part by a roof inner panel 34, a roof outer panel 36 and a header panel 38. A track 40 is attached to the roof rail 16 and extends longitudinally therealong between a rearward end generally adjacent the retractor 30 and a forward end generally adjacent the juncture of the roof rail 16 with the roof pillar 42. A carriage generally indicated at 46 is mounted for movement along the track 40 by a first pair of rollers 48 and 50 and a second pair of rollers 52 and 54. The carriage 46 includes a guide loop 60 which slidably receives the shoulder belt 22 intermediate its inboard and outboard ends. When the carriage 46 is located at its rearwardmost position of FIG. 3, the belt 22 assumes its normal occupant restraining position. When the carriage 46 is located at the forward end of the track, generally adjacent the roof pillar 42 as seen in FIG. 1, the shoulder belt 22 is stowed generally forward of the occupant seat 14 to facilitate occupant ingress and egress through the door 18.

Automatic movement of the carriage 46 between its forward and rearward positions is provided by a drive cable 62. The drive cable 62 has a forward end 64 which is suitably attached to the vehicle roof rail 16 or the roof pillar 42 at a point generally adjacent the forward end of the track 40. The rearward end 66 of the drive cable 62 is suitably attached to the upper rear corner of the door window frame 20. As best seen in the plan view of FIG. 3, the drive cable 62 generally coincides with the longitudinal path of the track 40 when the door 18 is in the closed position. The drive cable 62 extends slidably through the guide loop 60 as best seen in FIG. 4.

OPERATION

When the door 18 is closed as seen in FIG. 3, the winding effort of the shoulder belt retractor 30 retracts the shoulder belt 22 and in so doing carries the carriage 46 to its rearwardmost position generally adjacent the retractor 30. The alignment of the belt and the guide loop 60 relative the retractor 30 is preferably such that the imposition of an occupant restraint load upon the shoulder belt during an emergency situation does not impose any significant load upon the belt loop 60, carriage 46 and track 40.

Figure 2:
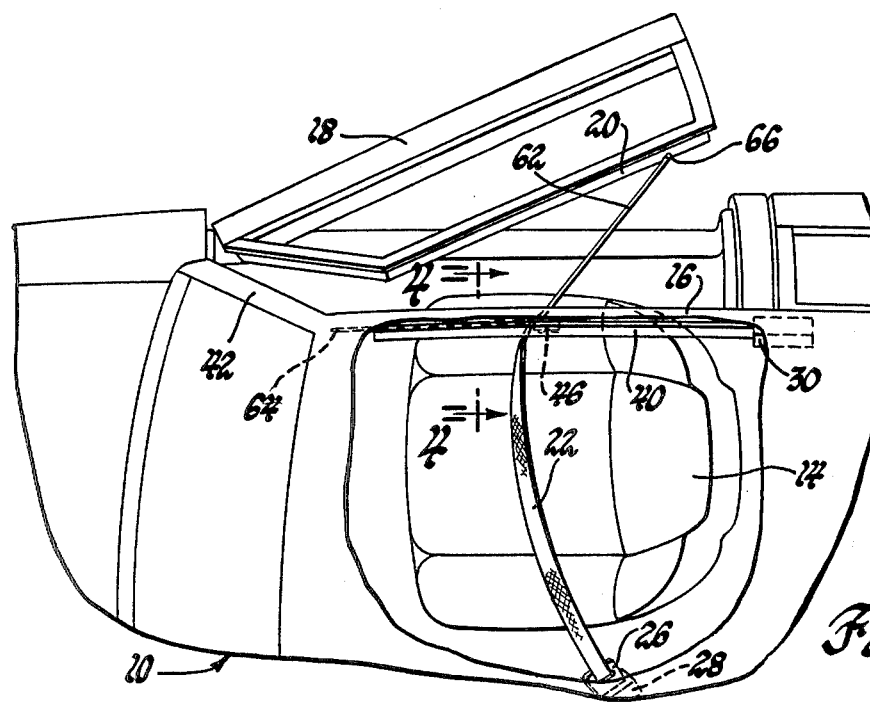
FIG. 2 is a plan view of the seat belt system showing the door in a partially opened position.

Referring to FIG. 2, it will be seen that the initial opening movement of the door from the closed position of FIG.3 causes the path of the drive cable 62 to diverge angularly from the longitudinal path of the guide track 40. Accordingly, the drive cable 62 imposes a longitudinal component of force upon the guide loop 60 and carriage 46 to drive the carriage 46 forwardly along the track 40. As the carriage 46 moves forwardly, the shoulder belt 22 is progressively withdrawn from the retractor 30. The belt 22 slides through the guide loop 60 as necessary to adjust for the change in distance between the guide loop 60 and the emergency release buckle 28. When the door reaches the full open position of FIG. 1, the drive cable 62 will have diverged substantially from the track 40 and driven the carriage 46 substantially fully forward along the track 40 to dispose the shoulder belt 22 substantially forward the seat 14 to facilitate occupant ingress and egress.

Subsequent closing of the door after the occupant has entered the seat will again cause the drive cable 62 to move into a path coincident with the track 40 thereby allowing the shoulder belt retractor 30 to retract the shoulder belt 22 and thereby draw the carriage 46 to its normal rearward position.

Thus, it is seen that the invention provides a new and improved passive restraint system wherein the outboard end of the shoulder belt is moved along a roof rail track and unwound from a roof mounted shoulder belt retractor by a drive cable extending between the door and the pillar and extending slidably through the belt carriage.

The embodiments of the invention in which an exclusive property or privilege is claimed are defined as follows:

1. In a motor vehicle body having a roof rail defining a door opening, and a door mounted laterally adjacent an occupant compartment having a seat;
   a shoulder belt having inboard and outboard ends;
   means mounting the inboard shoulder belt end adjacent the inboard occupant hip;
   means mounting the outboard shoulder belt end on the roof rail generally adjacent the shoulder of the occupant;
   one of said mounting means including a retractor;
   a carriage having a guide loop slidably receiving the shoulder belt intermediate the inboard and outboard ends thereof;
   a track mounted on the roof rail and mounting the carriage for longitudinal movement between a rearward position and a forward position;
   and a drive cable of fixed length having a rearward end attached to the upper rear corner of the door and a forward end attached to the roof rail adjacent the forward end of the track so that the drive cable assumes a position generally coincident with the track when the door is closed and assumes a position angularly divergent from the track when the door is open;
   said drive cable extending slidably through the guide loop to permit rearward retraction of the carriage by the retractor as the drive cable converges with the track during door closing movement to establish the belt in the restraining position and to drive the carriage forward as the cable diverges from the track during door opening movement to unwind the belt from the retractor and move the shoulder belt forwardly of the occupant to facilitate ingress and egress.

* * * * *